US009279086B2

(12) United States Patent
Hardacre et al.

(10) Patent No.: US 9,279,086 B2
(45) Date of Patent: Mar. 8, 2016

(54) PROCESS FOR REMOVING ORGANIC ACIDS FROM CRUDE OIL AND CRUDE OIL DISTILLATES

(75) Inventors: Chris Hardacre, Belfast (GB); Peter Goodrich, Belfast (GB); Kris Anderson, Belfast (GB)

(73) Assignee: The Queen's University of Belfast (GB)

( * ) Notice: Subject to any disclaimer, the term of this patent is extended or adjusted under 35 U.S.C. 154(b) by 231 days.

(21) Appl. No.: 13/322,470

(22) PCT Filed: Mar. 30, 2010

(86) PCT No.: PCT/GB2010/050548
§ 371 (c)(1),
(2), (4) Date: Feb. 13, 2012

(87) PCT Pub. No.: WO2010/136783
PCT Pub. Date: Dec. 2, 2010

(65) Prior Publication Data
US 2012/0132564 A1 May 31, 2012

(30) Foreign Application Priority Data

May 26, 2009 (GB) .................................. 0908986.3

(51) Int. Cl.
*C10G 21/27* (2006.01)
*C10G 29/20* (2006.01)
*C10G 21/28* (2006.01)
*C10G 25/00* (2006.01)

(52) U.S. Cl.
CPC .............. *C10G 21/27* (2013.01); *C10G 21/28* (2013.01); *C10G 25/003* (2013.01); *C10G 2300/104* (2013.01); *C10G 2300/1044* (2013.01); *C10G 2300/1051* (2013.01); *C10G 2300/1055* (2013.01); *C10G 2300/1062* (2013.01); *C10G 2300/203* (2013.01); *C10G 2400/02* (2013.01); *C10G 2400/04* (2013.01); *C10G 2400/08* (2013.01); *C10G 2400/10* (2013.01)

(58) Field of Classification Search
CPC .. C10G 2300/203; C10G 21/27; C10G 29/20; C10G 2300/1037
USPC ....................................................... 208/263
See application file for complete search history.

(56) References Cited

U.S. PATENT DOCUMENTS

| 4,199,440 A | 4/1980 | Varachtert |
| 4,248,694 A | 2/1981 | Carlson et al. |
| 5,997,731 A | 12/1999 | Suarez |
| 6,039,865 A | 3/2000 | Mesher ........................ 208/263 |
| 7,504,023 B2 * | 3/2009 | Chamberlain Pravia et al. ............................. 208/263 |
| 7,553,406 B2 * | 6/2009 | Wasserscheid et al. ....... 208/236 |
| 8,017,796 B2 * | 9/2011 | McNeff et al. ................. 554/193 |
| 8,118,994 B2 * | 2/2012 | Messer et al. ................... 208/47 |
| 2002/0011430 A1 | 1/2002 | Greaney |
| 2002/0169071 A1 | 11/2002 | Sauvage et al. ............... 502/150 |
| 2002/0198100 A1 | 12/2002 | Mehnert et al. ............... 502/150 |
| 2003/0085156 A1 | 5/2003 | Schoonover |
| 2005/0010076 A1 | 1/2005 | Wasserscheid et al. ....... 585/862 |
| 2006/0070919 A1 | 4/2006 | Vallee et al. |
| 2008/0306319 A1 | 12/2008 | Earle et al. .................... 585/516 |
| 2010/0029514 A1 * | 2/2010 | Berry et al. ..................... 507/90 |
| 2014/0091008 A1 * | 4/2014 | Hardacre et al. ................ 208/14 |

FOREIGN PATENT DOCUMENTS

| EP | 1 911 829 A1 | 4/2008 | ............. C10G 21/27 |
| FR | 2 861 084 | 4/2005 | ............. C10G 21/06 |
| GB | 499678 | 1/1939 | |
| GB | 912623 | 12/1962 | |
| GB | 2027049 A | 2/1980 | |
| JP | 4100543 A | 4/1992 | |
| WO | 0046322 A1 | 8/2000 | |
| WO | 2006072775 A2 | 7/2006 | |
| WO | 2007101397 A1 | 9/2007 | |
| WO | 2007138307 A2 | 12/2007 | |

OTHER PUBLICATIONS

International Search Report dated Oct. 21, 2010, in Application No. PCT/GB2010/050548.
International Preliminary Report on Patentability dated Nov. 29, 2011, in Application No. PCT/GB2010/050548.

* cited by examiner

*Primary Examiner* — Ellen McAvoy
(74) *Attorney, Agent, or Firm* — Ryan T. Grace; Advent, LLP

(57) ABSTRACT

The present invention relates to a process for the removal of organic acids, particularly naphthenic acids, from crude oils and crude oil distillates by use of a supported basic ionic liquid in a mass ratio of crude oil and/or crude oil distillate and ionic liquid of from greater than 40:1, the basic ionic liquid comprises a basic anion selected from serinate, prolinate, histidinate, threoninate, valinate, asparaginate, taurinate and lysinate.

47 Claims, No Drawings

PROCESS FOR REMOVING ORGANIC ACIDS FROM CRUDE OIL AND CRUDE OIL DISTILLATES

The present invention relates to a process for the removal of organic acids, and particularly naphthenic acids, from crude oils and crude oil distillates.

Naphthenic acids are carboxylic acids found in crude oil and in various crude oil distillates during the refining of crude oils. The term "naphthenic acids" encompasses a large number of carboxylic acid compounds comprising one or more cycloalkyl rings and having a molecular weight in the range of from about 120 to well over 700. The majority of naphthenic acids found in crude oils and crude oil distillates have a carbon backbone comprising 9 to 20 carbon atoms and cyclopentyl rings are the predominant cycloalkyl ring structure, although other cycloalkyl rings, such as cyclohexyl and cycloheptyl rings may be present in appreciable amounts.

The presence of acidic impurities in crude oil and crude oil distillates causes corrosion of pipelines and distillation equipment at the elevated temperatures used in oil refineries (greater than 200° C.), and acidic crude oils and crude oil distillates have reduced market value compared to crude oils and crude oil distillates of low acidity. Accordingly, effective methods are required to reduce the naphthenic acid content of crude oils and crude oil distillates.

The acidity of crude oils and crude oil distillates is measured in terms of the Total Acid Number (TAN) in accordance with ASTM D0664. The Total Acid Number is the amount of potassium hydroxide in milligrams that is needed to neutralize the acid in one gram of oil, with values in excess of 0.5 mg KOH/g being indicative of high acidity. Typical TAN values for acidic crude oils and crude oil distillates are in the range of 0.5 to 4.0 mg KOH/g, while acidic distillate fractions such as kerosene may have TAN values in the range of, for example, 0.5 to 8.0 mg KOH/g.

Various methods for deacidifying crude oil and crude oil distillates are known. In a conventional deacidification process, an alkali such as aqueous sodium hydroxide or aqueous potassium hydroxide is contacted with the oil to neutralize any acid present.

The reaction produces an aqueous phase comprising water, and alkali metal salt. This aqueous phase has to be removed from the deacidified oil before the oil can be used or sold. According to U.S. Pat. No. 4,199,440, a problem arises in that alkali metal carboxylates are chemically similar to soap, and tend to emulsify hydrocarbon and aqueous phases. This emulsion interferes with the efficient separation of the deacidified oil and aqueous phase.

A further example of a crude oil deacidification process is described in WO 00/46322. In this application, a crude oil is contacted with a polar solvent (for example, methanol), such that at least part of the acid present in the oil is extracted into the solvent as an extract phase. The extract phase is then separated from the oil. However, a problem with this process is that certain acid impurities are not extractable into the solvent. A further problem is that the acid partitions between the oil and the extract phase such that high amounts of polar solvent and repeated extractions are required to reduce the acid content of the oil to an acceptable level. This has the further disadvantage that large volumes of polar solvent must be regenerated for recycling to the extraction stage.

One aspect of this invention is based on the discovery that specifically selected ionic liquids may be used to more efficiently remove organic acids, and particularly naphthenic acids, from crude oils and crude oil distillates.

Ionic liquids are a novel class of compounds which have been developed over the last few years. The term "ionic liquid" as used herein refers to a liquid that is capable of being produced by melting a salt, and when so produced consists solely of ions. An ionic liquid may be formed from a homogeneous substance comprising one species of cation and one species of anion, or it can be composed of more than one species of cation and/or more than one species of anion. Thus, an ionic liquid may be composed of more than one species of cation and one species of anion. An ionic liquid may further be composed of one species of cation, and one or more species of anion. Still further, an ionic liquid may be composed of more than one species of cation and more than one species of anion.

The term "ionic liquid" includes compounds having both high melting points and compounds having low melting points, e.g. at or below room temperature. Thus, many ionic liquids have melting points below 200° C., preferably below 150° C., particularly below 100° C., around room temperature (15 to 30° C.), or even below 0° C. Ionic liquids having melting points below around 30° C. are commonly referred to as "room temperature ionic liquids" and are often derived from organic salts having nitrogen-containing heterocyclic cations, such as imidazolium and pyridinium-based cations. In room temperature ionic liquids, the structures of the cation and anion prevent the formation of an ordered crystalline structure and therefore the salt is liquid at room temperature.

Ionic liquids are most widely known as solvents, because of their negligible vapour pressure, temperature stability, low flammability and recyclability. Due to the vast number of anion/cation combinations that are available it is possible to fine-tune the physical properties of the ionic liquid (e.g. melting point, density, viscosity, and miscibility with water or organic solvents) to suit the requirements of a particular application.

According to US 2003/0085156 ionic liquids may be used in the removal of organosulfur compounds, such as mercaptans, sulfides, disulfides, thiophenes, benzothiophenes and dibenzothiophenes, from hydrocarbon materials via countercurrent contact between a hydrocarbon stream and an ionic liquid. In the examples disclosed, large quantities of ionic liquid are required, for example, 2.0 mL of ionic liquid per 2.0 mL of hydrocarbon.

US 2006/0070919 is concerned with the processing of Fischer-Tropsch synthesis effluents and more particularly alcohols and acids formed during such a reaction. Similar to US 2003/0085156, large quantities of ionic liquid were required, for example, 2.0 mL of ionic liquid per 4.0 mL of hydrocarbon, in order to demonstrate satisfactory results.

It is readily apparent that such large quantities of ionic liquids are not practical for commercial applications.

In accordance with the present invention, there is provided a process for removing organic acids from a crude oil and/or a crude oil distillate containing organic acids comprising the steps of:
 (i) contacting the crude oil and/or crude oil distillate containing organic acids with a supported basic ionic liquid having a basic anion selected from serinate, prolinate, histidinate, threoninate, valinate, asparaginate, taurinate and lysinate, wherein the crude oil and/or crude oil distillate and the basic ionic liquid are contacted in a mass ratio of from greater than 40:1; and
 (ii) obtaining a crude oil and/or crude oil distillate product having reduced acidity which is separated from the supported basic ionic liquid.

The present inventors have surprisingly found that the use of a supported basic ionic liquid having a basic anion selected from serinate, prolinate, histidinate, threoninate, valinate, asparaginate, taurinate and lysinate allows a crude oil/crude oil distillate to be more efficiently processed, such that a mass ratio of crude oil/crude oil distillate to basic ionic liquid of greater than 40:1 may be used.

Examples of organic acids that may be present in the crude oil/crude oil distillate include phenolic acids, sulphur-containing acids, and most commonly, naphthenic acids. Preferably, the processes of the present invention are for the removal of naphthenic acids.

The process of the present invention is effective at mass ratios of crude oil and/or crude oil distillate to basic ionic liquid of up to 200:1, and 300:1, and even greater than 300:1.

The crude oil and/or crude oil distillate and the ionic liquid may be contacted in a mass ratio of from greater than 50:1, and from greater than 100:1, and also from greater than 150:1.

In a preferred embodiment of the present invention, the basic anion is selected from serinate, lysinate, prolinate, taurinate and threoninate, more preferably from lysinate, prolinate and serinate.

Suitable supports for use in the present invention may be selected from silica, alumina, alumina-silica, or a zeolite. Preferably, the support is silica.

Methods for supporting an ionic liquid on a support material are well known in the art, such for example, in US 2002/0169071, US 2002/0198100 and US 2008/0306319. Typically, the basic ionic liquid may be physiosorbed or chemisorbed on the support material, and is preferably chemisorbed.

In the processes of the present invention, the ionic liquid may be adsorbed onto the support in an ionic liquid:support mass ratio of from 10:1 to 1:10, preferably in an ionic liquid:support mass ratio of from 1:2 to 2:1.

In accordance with a further aspect of the present invention, there is provided a process for removing organic acids, such as those described above, and preferably naphthenic acids, from a crude oil and/or a crude oil distillate containing organic acids comprising the steps of:
  (i) contacting the crude oil and/or crude oil distillate containing organic acids with a basic ionic liquid having a basic anion selected from serinate, prolinate, histidinate, threoninate, valinate, asparaginate, taurinate and lysinate, and further wherein the crude oil and/or crude oil distillate and the ionic liquid are contacted in a mass ratio of from greater than 40:1; and
  (ii) obtaining a crude oil and/or crude oil distillate product having reduced acidity which is separated from the basic ionic liquid.

In the further aspect, the basic anion is preferably selected from serinate, prolinate, histidinate, taurinate and lysinate, more preferably serinate, lysinate and prolinate. The basic anion may also be selected from histidinate and taurinate.

In the further aspect, the mass ratios of the crude oil and/or crude oil distillate to the basic ionic liquid may be up to 100:1, and 125:1, and even up to 150:1. The crude oil and/or crude oil distillate and the ionic liquid may be contacted in a mass ratio of from greater than 50:1, and from greater than 75:1, and also from greater than 100:1.

The processes of the present inventions as described herein are able to obtain crude oil/crude oil distillates having a TAN value of less than 0.25 mg/g, preferably less than 0.2 mg/g, more preferably less than 0.1 mg/g, still more preferably less than 0.075 mg/g and most preferably less than 0.05 mg/g.

In the further aspect, the basic ionic liquid preferably has a melting point of less than 150° C., and more preferably less than 100° C. Alternatively, an ionic with a higher melting point, i.e. greater than 20° C., preferably greater than 100° C., and more preferably greater than 150° C. may be used where it is intended to contact a solid ionic liquid with the crude oil/crude oil distillate.

In the processes of the present inventions, the basic ionic liquid may comprise a cation selected or derived from the group consisting of: ammonium, azaannulenium, azathiazolium, benzimidazolium, benzofuranium, benzothiophenium, benzotriazolium, borolium, cinnolinium, diazabicyclodecenium, diazabicyclononenium, diazabicycloundecenium, dibenzofuranium, dibenzothiophenium, dithiazolium, furanium, guanidinium, imidazolium, indazolium, indolinium, indolium, morpholinium, oxaborolium, oxaphospholium, oxathiazolium, oxazinium, oxazolium, iso-oxazolium, oxazolinium, pentazolium, phospholium, phosphonium, phthalazinium, piperazinium, piperidinium, pyranium, pyrazinium, pyrazolium, pyridazinium, pyridinium, pyrimidinium, pyrrolidinium, pyrrolium, quinazolinium, quinolinium, iso-quinolinium, quinoxalinium, selenazolium, sulfonium, tetrazolium, thiadiazolium, iso-thiadiazolium, thiazinium, thiazolium, iso-thiazolium, thiophenium, thiuronium, triazadecenium, triazinium, triazolium, iso-triazolium, and uronium.

In one embodiment, the cation may be selected from the group consisting of:

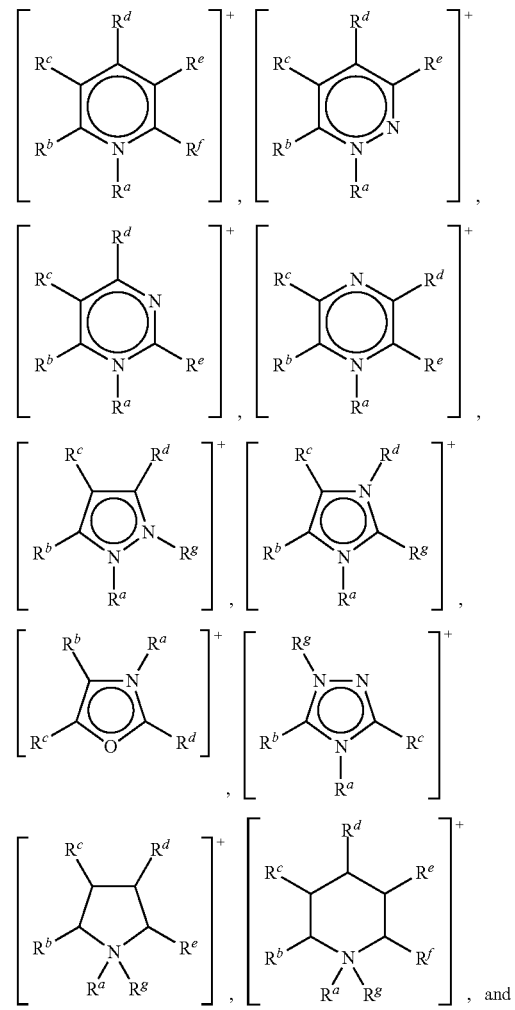

, and

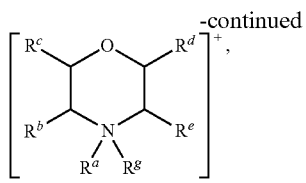

wherein: $R^a$, $R^b$, $R^c$, $R^d$, $R^e$, $R^f$ and $R^g$ are each independently selected from hydrogen, a $C_1$ to $C_{30}$, straight chain or branched alkyl group, a $C_3$ to $C_8$ cycloalkyl group, or a $C_6$ to $C_{10}$ aryl group, wherein said alkyl, cycloalkyl or aryl groups are unsubstituted or may be substituted by one to three groups selected from: $C_1$ to $C_6$ alkoxy, $C_2$ to $C_{12}$ alkoxyalkoxy, $C_3$ to $C_8$ cycloalkyl, $C_6$ to $C_{10}$ aryl, —CN, —OH, —SH, —$NO_2$, $C_6$ to $C_{10}$ aryl and $C_7$ to $C_{10}$ alkaryl, —$CO_2(C_1$ to $C_6$)alkyl, —OC(O)($C_1$ to $C_6$)alkyl, or any two of $R^b$, $R^c$, $R^d$, $R^e$ and $R^f$ attached to adjacent carbon atoms form a methylene chain—$(CH_2)_q$— wherein q is from 3 to 6.

Preferably, $R^a$, $R^b$, $R^c$, $R^d$, $R^e$, $R^f$ and $R^g$ are each independently selected from a $C_1$ to $C_{20}$ straight chain or branched alkyl group, a $C_3$ to $C_6$ cycloalkyl group, or a $C_6$ aryl group, wherein said alkyl, cycloalkyl or aryl groups are unsubstituted or may be substituted by one to three groups selected from: $C_1$ to $C_6$ alkoxy, $C_2$ to $C_{12}$ alkoxyalkoxy, $C_3$ to $C_8$ cycloalkyl, $C_6$ to $C_{10}$ aryl, —CN, —OH, —SH, —$NO_2$, —$CO_2(C_1$ to $C_6$)alkyl, —OC(O)($C_1$ to $C_6$)alkyl, $C_6$ to $C_{10}$ aryl and $C_7$ to $C_{10}$ alkaryl, and wherein one of $R^b$, $R^c$, $R^d$, $R^e$, $R^f$ and $R^g$ may also be hydrogen.

$R^a$ is preferably selected from $C_1$ to $C_{30}$, linear or branched, alkyl, more preferably $C_2$ to $C_{20}$ linear or branched alkyl, still more preferably, $C_2$ to $C_{10}$ linear or branched alkyl, and most preferably $R^a$ is selected from ethyl, n-butyl, n-hexyl and n-octyl. Further examples include wherein $R^a$ is selected from methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl and n-octadecyl.

In the cations comprising an $R^g$ group, $R^g$ is preferably selected from $C_1$ to $C_{10}$ linear or branched alkyl, more preferably, $C_1$ to $C_5$ linear or branched alkyl, and most preferably $R^g$ is a methyl group.

In the cations comprising both an $R^a$ and an $R^g$ group, $R^a$ and $R^g$ are each preferably independently selected from $C_1$ to $C_{30}$, linear or branched, alkyl, and one of $R^a$ and $R^g$ may also be hydrogen. More preferably, one of $R^a$ and $R^g$ may be selected from $C_2$ to $C_{20}$ linear or branched alkyl, still more preferably, $C_2$ to $C_{10}$ linear or branched alkyl, and most preferably $C_4$ to $C_8$ linear or branched alkyl, and the other one of $R^a$ and $R^g$ may be selected from $C_1$ to $C_{10}$ linear or branched alkyl, more preferably, $C_1$ to $C_5$ linear or branched alkyl, and most preferably a methyl group. In a further preferred embodiment, $R^a$ and $R^g$ may each be independently selected, where present, from $C_1$ to $C_{30}$ linear or branched alkyl and $C_1$ to $C_{15}$ alkoxyalkyl.

In another embodiment, the cation may be selected from the group consisting of:

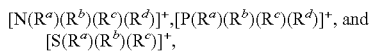

wherein: $R^a$, $R^b$, $R^c$ and $R^d$ are as defined above.
Preferably, the cation is selected from:

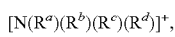

wherein: $R^a$, $R^b$, $R^c$ and $R^d$ are each independently selected from $C_1$ to $C_8$ alkyl, including $C_2$, $C_4$ and $C_6$ alkyl.

In the processes of the present invention, the term "crude oil or a crude oil distillate" is intended to include liquefied petroleum gas, gasoline, gas oil, naphtha, kerosene, diesel fuel, fuel oil, jet fuel, home heating oil, lubricating oil or paraffin wax, or mixtures thereof.

In the processes of the present inventions, the basic ionic liquid may additionally comprise a basic cation represented by the formula:

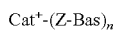

wherein:
Cat$^+$ is a positively charged moiety;
Bas is a basic moiety;
Z is a covalent bond joining Cat$^+$ and Bas, or is a divalent linking group; and
n is an integer of from 1 to 3, and preferably n is 1.

Suitably, Bas comprises at least one basic nitrogen, phosphorus, sulfur, or oxygen atom, preferably, at least one basic nitrogen atom.

Bas may comprise a heterocyclic ring system containing a basic nitrogen atom, such as a pyrrolidine or piperidine ring.

Preferably, Bas is selected from —N($R^1$)($R^2$), —P($R^1$)($R^2$) and —S$R^3$. Bas may also be —O$R^3$. Suitably, $R^1$ and $R^2$ are independently selected from hydrogen, linear or branched alkyl, cycloalkyl, aryl and substituted aryl, or, in the case of an —N($R^1$)($R^2$) group, $R^1$ and $R^2$ together with the interjacent nitrogen atom form part of a heterocyclic ring. Suitably, $R^3$ is selected from linear or branched alkyl, cycloalkyl, aryl and substituted aryl.

Preferably, $R^1$, $R^2$ and $R^3$ are selected from methyl, ethyl, n-propyl, isopropyl, n-butyl, iso-butyl, tert-butyl, n-pentyl, n-hexyl, cyclohexyl, benzyl and phenyl, or, in the case of an —N($R^1$)($R^2$) group, $R^1$ and $R^2$ together represent a tetramethylene or pentamethylene group optionally substituted by one or more $C_{1-4}$ alkyl groups.

Preferably, the basic moiety is a "hindered basic group" i.e. is a functional group that acts as a base and, owing to steric hindrance, does not chemically bond to any of the components of the oil (other of course than by accepting a proton in the usual reaction of a Brønsted acid with a Brønsted base). Suitable hindered basic groups include —N(CH($CH_3$)$_2$)$_2$ and —N(C($CH_3$)$_3$)$_2$. Preferably, the hindered basic group has a lower nucleophilicity (or greater steric hindrance) than —N($C_2H_5$)$_3$.

In the context of the present invention, the group —OH is not considered basic due to difficulties with protonation. Accordingly, Bas as defined herein does not include —OH, and in a preferred embodiment, does not include —O$R^3$.

Z may be a divalent organic radical having from 1 to 18 carbon atoms, preferably 1 to 8 carbon atoms, more preferably, 2 to 6 carbon atoms. The divalent organic radical, Z, may be branched or unbranched. The divalent organic radical, Z, may be substituted or unsubstituted. Preferably, the valence bonds are on different carbon atoms of the divalent organic radical, Z.

Suitably, the divalent organic radical, Z, is a divalent aliphatic radical (for example, alkylene, alkenylene, cycloalkylene, oxyalkylene, oxyalkyleneoxy, alkyleneoxyalkylene or a polyoxyalkylene) or is a divalent aromatic radical (for example, arylene, alkylenearylene or alkylenearylenealkylene).

Preferably, Z is:
(a) a divalent alkylene radical selected from: —($CH_2$—$CH_2$)—, —($CH_2$—$CH_2$—$CH_2$)—, —($CH_2$—$CH_2$—$CH_2$—$CH_2$)—, —($CH_2$—$CH_2$—$CH_2$—$CH_2$—$CH_2$)—, —($CH_2$—$CH_2$—$CH_2$—$CH_2$—$CH_2$—

CH$_2$)—, —(CH$_2$—CH(CH$_3$))—, and —(CH$_2$—CH(CH$_3$)—CH$_2$—CH(CH$_3$))—;

(b) a divalent alkyleneoxyalkylene radical selected from: —(CH$_2$CH$_2$—O—CH$_2$—CH$_2$)—, —(CH$_2$—CH$_2$—O—CH$_2$—CH$_2$—CH$_2$)—, and —(CH$_2$CH(CH$_3$)—O—CH$_2$—CH(CH$_3$))—;

(c) a divalent polyoxyethylene radical selected from: —(CH$_2$CH$_2$O)$_n$— where n is an integer in the range 1 to 9 or —(CH$_2$CH(CH$_3$)O)$_m$— where m is an integer in the range 1 to 6; and (d) a divalent alkylenearylene or an alkylenearylenealkylene radical selected from: —(CH$_2$—C$_6$H$_4$)—, and —(CH$_2$—C$_6$H$_4$—CH$_2$)—.

The Cat$^+$ moiety may comprise a heterocyclic ring structure selected from: ammonium, azaannulenium, azathiazolium, benzimidazolium, benzofuranium, benzothiophenium, benzotriazolium, borolium, cinnolinium, diazabicyclodecenium, diazabicyclononenium, diazabicycloundecenium, dibenzofuranium, dibenzothiophenium, dithiazolium, furanium, guanidinium, imidazolium, indazolium, indolinium, indolium, morpholinium, oxaborolium, oxaphospholium, oxathiazolium, oxazinium, oxazolium, iso-oxazolium, oxazolinium, pentazolium, phospholium, phosphonium, phthalazinium, piperazinium, piperidinium, pyranium, pyrazinium, pyrazolium, pyridazinium, pyridinium, pyrimidinium, pyrrolidinium, pyrrolium, quinazolinium, quinolinium, iso-quinolinium, quinoxalinium, selenazolium, sulfonium, tetrazolium, thiadiazolium, iso-thiadiazolium, thiazinium, thiazolium, iso-thiazolium, thiophenium, thiuronium, triazadecenium, triazinium, triazolium, iso-triazolium, and uronium.

Examples of Cat$^+$-Z-Bas where Cat$^+$ is a heterocyclic ring structure include:

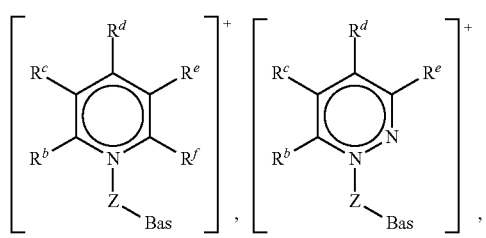

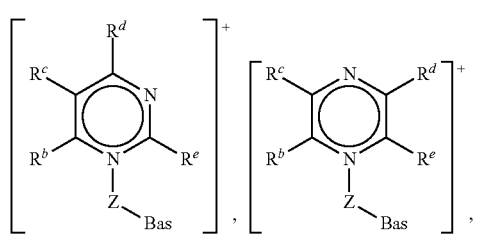

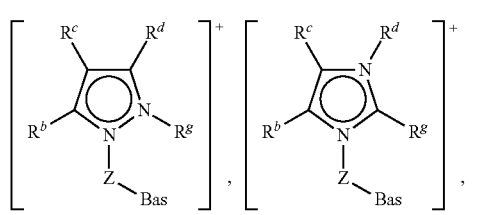

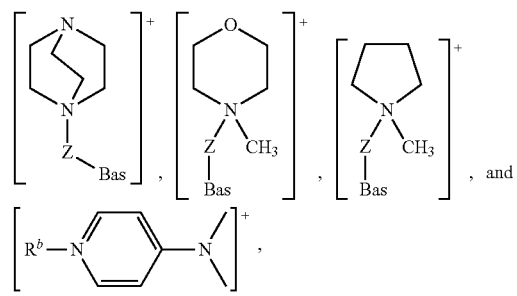

wherein: Bas and Z are as defined above; and R$^b$, R$^c$, R$^d$, R$^e$, R$^f$ and R$^g$ are independently selected from hydrogen, a C$_1$ to C$_{40}$, straight chain or branched alkyl group, a C$_3$ to C$_8$ cycloalkyl group, or a C$_6$ to C$_{10}$ aryl group, wherein said alkyl, cycloalkyl or aryl groups are unsubstituted or may be substituted by one to three groups selected from: C$_1$ to C$_6$ alkoxy, C$_6$ to C$_{10}$ aryl, CN, OH, NO$_2$, C$_7$ to C$_{30}$ aralkyl and C$_7$ to C$_{30}$ alkaryl, or any two of R$^b$, R$^c$, R$^d$, R$^e$ and R$^f$ attached to adjacent carbon atoms on the ring structure form a methylene chain —(CH$_2$)$_p$— wherein p is an integer from 3 to 5.

Preferred Cat$^+$-Z-Bas, where Cat$^+$ is a heterocyclic ring structure, includes:

wherein: Bas, Z and R$^b$ are as defined above.

It is particularly preferred that Cat$^+$ is a heterocyclic ring structure and Bas is a sterically hindered amino group, for example:

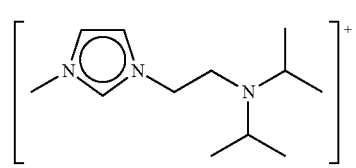

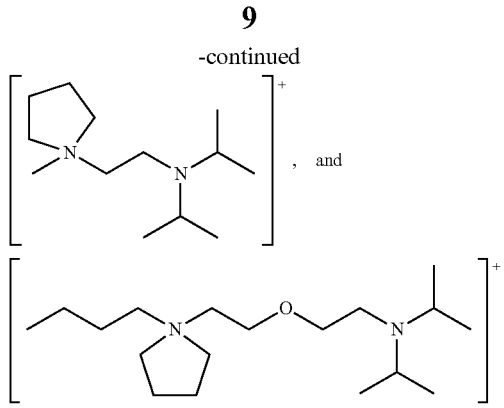

The heterocyclic Cat⁺ moiety may be obtained by alkylation, protonation and/or acylation of a precursor selected from: azaannulenes, azathiazoles, benzimidazoles, benzofurans, benzothiophenes, benzotriazoles, boroles, cinnolines, diazabicyclodecenes, diazabicyclononenes, diazabicycloundecenes, dibenzofurans, benzothiophenes, dibenzothiophenes, dithiazoles, furans, imidazoles, indazoles, indolines, indoles, morpholines, oxaboroles, oxaphospholes, oxathiazoles, oxazines, oxazoles, iso-oxazoles, oxazolines, pentazoles, phospholes, phthalazines, piperazines, piperidines, pyrans, pyrazines, pyrazoles, pyridazines, pyridines, pyrimidines, pyrrolidines, pyrroles, quinazolines, quinolines, iso-quinolines, quinoxalines, selenazoles, tetrazoles, thiadiazoles, iso-thiadiazoles, thiazines, thiazoles, isothiazoles, thiophenes, triazadecenes, triazines, triazoles, iso-triazoles.

It is also envisaged that the Cat⁺ moiety may be an acyclic hydrocarbyl moiety. Preferably, the acyclic hydrocarbyl moiety comprises a group selected from amino amidino, imino, guanidino, phosphino, arsino, stibino, alkoxyalkyl, alkylthio, alkylseleno and phosphinimino.

Where the Cat⁺ moiety is an acyclic hydrocarbyl moiety, [Cat⁺-Z-Bas] is preferably selected from:

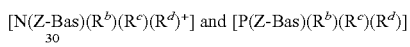

wherein: Bas, Z, $R^b$, $R^c$, and $R^d$ are as defined above. It is particularly preferred that $R^b$, $R^c$, and $R^d$ are independently selected from methyl and ethyl.

Examples of preferred [Cat⁺-Z-Bas] of this class include:

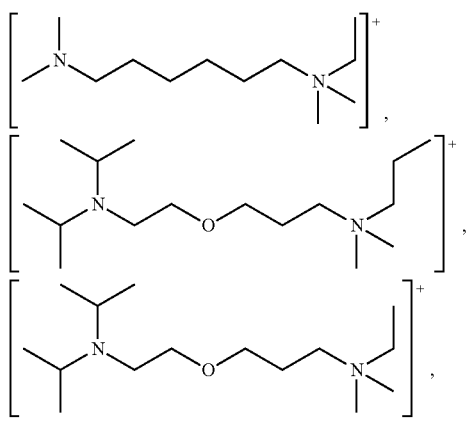

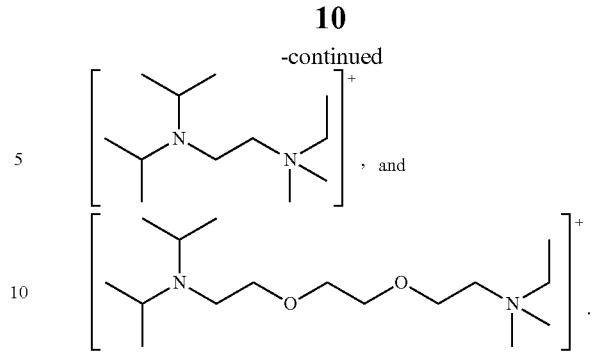

where Bas is the sterically hindered amino group, —N(CH(CH₃)₂)₂.

[Cat⁺-Z-Bas] may also be:

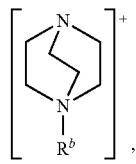

wherein: $R^b$ is as defined above.

Where the basic ionic liquid is unsupported, it is preferably immiscible with the oil. By immiscible with the oil is meant that the basic ionic liquid is soluble in the treated oil phase at a concentration of less than 50 ppm, preferably less than 30 ppm, more preferably less than 20 ppm, most preferably, less than 10 ppm, for example, less than 5 ppm. Thus, the solubility of the basic ionic liquid is tailored so that the basic ionic liquid is immiscible with the oil. The solubility of the basic ionic liquid may also be tailored such that the basic ionic liquid is either insoluble or soluble in water. By insoluble in water is meant that the basic ionic liquid has a solubility in water of less than 50 ppm, preferably, less than 30 ppm, more preferably less than 20 ppm, most preferably, less than 10 ppm, for example, less than 5 ppm.

It will be appreciated that for uses of crude oil/crude oil distillate which are not sensitive to the presence of any ionic liquid, it is not a requirement that the ionic liquid have a low immiscibility with the oil.

Suitably, the contacting steps (i), of the processes of the present invention, are carried out at a temperature of from ambient temperature to 150° C. Suitably, the contacting steps (i) are carried out at a pressure of from 0.1 MPa absolute to 10 MPa absolute (1 bar absolute to 100 bar absolute).

Where the ionic liquid is unsupported, step (i) may be carried out by contacting the crude oil and/or crude oil distillate with the basic ionic liquid in a vessel wherein the resulting mixture is stirred using, for example, a mechanical stirrer, an ultrasonic stirrer, an electromagnetic stirrer or by bubbling an inert gas through the mixture. Suitably, the crude oil and/or crude oil distillate and the basic ionic liquid may be contacted in the extraction step in a volume ratio of from greater than 40:1 to 300:1, and may be contacted in a mass ratio of from greater than 50:1, preferably from greater than 100:1. The mixing step may last from 1 minute to 60 minutes, preferably 2 to 30 minutes, more preferably, 5 to 20 minutes and most preferably, 8 to 15 minutes.

It will be understood that in the processes (i.e. supported and unsupported ionic liquids) of the present invention, it is not a requirement that the molar amount of basic ionic liquid employed in the contacting steps (i) be at least equivalent to the molar amount of organic-containing acid in the crude oil and/or crude oil distillate.

Where the basic ionic liquid is water soluble, and the crude oil and/or crude oil distillate to be treated using the process of the present invention has a high water content it may be necessary to dehydrate the crude oil and/or crude oil distillate prior to contacting the crude oil and/or crude oil distillate with the basic ionic liquid in steps (i). The water may be separated from the crude oil and/or crude oil distillate in, for example, a separator or coalescer. Preferably, the concentration of water in the crude oil and/or crude oil distillate is less than 0.5% by volume of oil, for example, less than 0.25% by volume. Where the basic ionic liquid is insoluble in water, it is believed that any water present in the mixture may be beneficial in achieving the clean separation of the unsupported basic ionic liquid from the treated crude oil and/or crude oil distillate in step (ii). Accordingly, it is not necessary to dehydrate the crude oil and/or crude oil distillate prior to step (i).

For unsupported basic ionic liquids, step (ii) may be carried out by gravity separation, (for example, in a settling unit) where the treated the crude oil and/or crude oil distillate is generally the upper phase and the basic ionic liquid the lower phase in the settling unit. Where the unsupported basic ionic liquid is insoluble in water, the presence of the water will result in a 3 phase mixture where the treated the crude oil and/or crude oil distillate is generally the upper phase, the water is the middle phase and the basic ionic liquid containing the organic acid is the lower phase in the settling unit. The phases may also be separated in step (ii) using, for example, a decanter, a hydrocyclone, electrostatic coalescer or a centrifuge. Step (i) followed by step (ii) may be repeated several times, preferably 2 to 6, for example 2 to 4 times, until the level of organic acids in the crude oil and/or crude oil distillate is reduced to an acceptable value.

Steps (i) and (ii) may also be carried out together in a counter-current extraction column. The crude oil and/or crude oil distillate contaminated with the organic-containing acids (hereinafter "oil feed stream") is generally introduced at or near the bottom of the counter-current extraction column and the basic ionic liquid (hereinafter "basic ionic liquid feed stream") at or near the top of the counter-current extraction column. A crude oil and/or crude oil distillate phase which is reduced in acid content (hereinafter "product oil stream") is withdrawn from the top of the column and a basic ionic liquid extract phase containing the extracted acids (hereinafter "extract stream") from at or near the bottom thereof. Preferably, the counter-current extraction column has a sump region for collecting the basic ionic liquid extract phase. Preferably, the oil feed stream is introduced to the counter-current extraction column immediately above the sump region. More than one counter-current extraction column may be employed, for example 2 to 6, preferably 2 to 3 columns arranged in series. Preferably, the counter-current extraction column is packed with a structured packing material, for example, glass Raschig rings, thereby increasing the flow path for the oil and basic ionic liquid through the column. Alternatively, the counter-current extraction column may contain a plurality of trays.

Steps (i) and (ii) may also be carried out together in a centrifugal contact separator, for example, a centrifugal contact separator as described in U.S. Pat. No. 4,959,158, U.S. Pat. No. 5,571,070, U.S. Pat. No. 5,591,340, U.S. Pat. No. 5,762,800, WO 99/12650, and WO 00/29120. Suitable centrifugal contact separators include those supplied by Costner Industries Nevada, Inc. The crude oil and/or crude oil distillate contaminated with organic-containing acids and the basic ionic liquid may be introduced into an annular mixing zone of the centrifugal contact separator. Preferably, the crude oil and/or crude oil distillate, contaminated with the organic-containing acids, and the basic ionic liquid are introduced as separate feed streams into the annular mixing zone. The crude oil and/or crude oil distillate, and basic ionic liquid are rapidly mixed in the annular mixing zone such that at least a portion of the organic-containing acids are extracted from the crude oil and/or crude oil distillate into the basic ionic liquid. The resulting mixture is then passed to a separation zone wherein a centrifugal force is applied to the mixture to produce a clean separation of an oil phase and a basic ionic liquid extract phase. Preferably, a plurality of centrifugal contact separators are used in series, preferably, 2 to 6, for example 2 to 3. Preferably, the crude oil and/or crude oil distillate feed stream is introduced into the first centrifugal contact separator in the series while the basic ionic liquid feed stream is introduced into the last centrifugal contact separator in the series such that crude oil and/or crude oil distillate of progressively decreasing organic acid content is passed from the first through to the last centrifugal contact separator in the series while a basic ionic liquid of progressively increasing organic acid content is passed from the last through to the first centrifugal contact separator in the series. Thus, the basic ionic liquid extract phase is removed from the first centrifugal contact separator and the crude oil and/or crude oil distillate phase of reduced acidity from the last centrifugal contact separator in the series.

The crude oil and/or crude oil distillate phase of reduced acidity (product oil stream) which is isolated from step (ii) may be used directly or may be further processed, for example, by fractional distillation. If necessary, any residual unsupported basic ionic liquid that is present in the treated oil may be recovered by passing the product oil stream through a silica column such that the residual basic ionic liquid is adsorbed onto the silica column. The adsorbed basic ionic liquid may then be washed off the silica column using a solvent for the basic ionic liquid and the basic ionic liquid may be recovered by driving off the solvent at reduced pressure. Alternatively, the oil may be removed from the residual ionic liquid by hot gas stripping using, for example, hot nitrogen gas.

For the supported basic ionic liquids, contacting step (i) and separation step (ii) may also be carried out together by passing the oil through a column packed with a supported basic ionic liquid (i.e. a packed bed arrangement). Thus, the oil containing the organic acids may be passed through a column containing the supported basic ionic liquid. The organic acids will become associated with the supported basic ionic liquid and oil having a reduced acid content will be removed from the column. In addition, or alternatively, a fixed-bed arrangement having a plurality of plates and/or trays may be used.

The processes of the present inventions may additionally comprise the step of recovering the basic ionic liquid. Recovery of the basic ionic liquid preferably comprises recovering the basic ionic liquid from the organic acids by way of a regeneration process.

The regeneration process preferably comprises:
  (i) contacting the basic ionic liquid with an acid having a pKa of less than 6.75.

The regeneration process preferably further comprises the steps of:
  (ii) contacting the mixture of step (i) with a solvent which is immiscible with the basic ionic liquid; and
  (iii) separating the solvent from the ionic liquid.

In accordance with another aspect of the present invention, there is provided a process for the regeneration of a basic ionic liquid comprising organic acids from crude oil/crude oil distillate comprising the steps of:
(i) contacting the basic ionic liquid with an acid having a pKa of less than 6.75;
(ii) contacting the mixture of step (i) with a solvent which is immiscible with the basic ionic liquid; and
(iii) separating the solvent from the ionic liquid.

Preferably, the pKa of the acid is less than 6.25.

Suitable acids for use in the regeneration process are those that meet the pKa requirements above. Preferably, the acid is carbonic acid.

It will be appreciated that the above process is suitable for both supported and unsupported ionic liquids.

Other suitable regeneration methods include:
(1) extraction of the organic acids into a solvent that is immiscible with the basic ionic liquid;
(2) vaporization of the acids at a reduced pressure and at a temperature less than the decomposition temperature of the ionic liquid, preferably, a temperature less than 200° C.;
(3) reaction of the acids within the basic ionic liquid to form: (i) products that are insoluble in the basic ionic liquid, (ii) products that are more readily extracted into a solvent that is immiscible with the basic ionic liquid, or (iii) volatile products that are more readily separated from the basic ionic liquid;
(4) gas stripping wherein a hot gas, for example steam or nitrogen is passed through the ionic liquid to volatilize the acids;
(5) extraction of the acids with a supercritical fluid, for example, liquefied carbon dioxide;
(6) membrane separation (polymer-based, ceramic, zeolite and liquid-liquid systems) where the membrane is selectively permeable to the acids; and combinations of these methods; and
(7) a combination of two or more of the above methods.

In one preferred method, the organic acids contained in the separated basic ionic liquid extract phase are reacted with a Group 1 and/or Group 2 metal hydroxide (for example calcium hydroxide) such that at least a portion of the acids, preferably, substantially all of the acids, are converted into Group 1 and/or Group 2 neutralization salts thereof within the basic ionic liquid. For example, the basic ionic liquid extract phase may be contacted with solid Group 1 and/or Group 2 metal hydroxide. Without wishing to be bound by any theory, it is believed that the neutralization salts formed by the reaction of the Brønsted acid and the Brønsted base may precipitate from the basic ionic liquid and may therefore be readily separated therefrom. Alternatively, where the basic ionic liquid is insoluble in a polar solvent, the neutralization salts may be extracted from the basic ionic liquid extract phase into the polar solvent. By insoluble in the polar solvent it is meant that the basic ionic liquid has a solubility in the polar solvent of less than 50 ppm, preferably, less than 30 ppm, more preferably, less than 20 ppm, most preferably, less than 10 ppm, for example, less than 5 ppm. Suitable polar solvents include water and polar organic solvents such as $C_1$ to $C_6$ aliphatic alcohols, in particular, methanol or ethanol. Where the basic ionic liquid is insoluble in the polar solvent, it is preferred to contact the basic ionic liquid extract phase with a solution of the Group 1 and/or Group 2 metal hydroxide in the polar solvent thereby generating a basic ionic liquid phase of reduced organic acid content and a polar solvent extract phase containing the Group 1 and/or Group 2 metal neutralization salts. Where the polar solvent is a polar organic solvent, the volume ratio of polar organic solvent to basic ionic liquid is typically less than 1:1, preferably less than 0.5:1, more preferably, less than 0.25:1, for example, less than 0.1:1. The polar organic solvent may then be recovered by volatilization of the solvent at reduced pressure leaving behind a solid residue comprising the Group 1 and/or Group 2 metal neutralization salts. Accordingly, it is preferred to contact the basic ionic liquid extract phase with the minimum amount of the solution of the Group 1 and/or Group 2 metal hydroxide in the polar organic solvent. Preferably, the polar solvent is water resulting in a waste water stream containing the Group 1 and/or Group 2 metal neutralization salts of the acid. Where the method of the present invention is employed offshore on a hydrocarbon production platform, the water is preferably seawater and the waste water stream may be disposed of by, for example, being injected into a porous subterranean formation (waste water disposal zone). Thus, higher amounts of water may be employed than polar organic solvent.

The Group 1 metal hydroxide may be selected from lithium hydroxide, sodium hydroxide, and potassium hydroxide, preferably, sodium hydroxide. Suitably, the Group 2 metal hydroxide is selected from barium hydroxide, magnesium hydroxide, and calcium hydroxide, preferably, calcium hydroxide. Mixtures of Group 1 and/or Group 2 metal hydroxides may be employed. However, it is preferred to employ a Group 2 metal salt or mixtures thereof owing to the risk of Group 1 metal salts of the acids forming soaps that can interfere with the separation of the polar solvent from the basic ionic liquid. Particularly preferred is calcium hydroxide.

In a further preferred method, the organic acids contained in the separated basic ionic liquid extract phase are reacted with a Group 1 and/or Group 2 metal carbonate salt (for example Dolomite—$CaMg(CO_3)_2$), such that at least a portion of the acids, preferably, substantially all of the acids, are converted into Group 1 and/or Group 2 neutralization salts thereof. Where the carbonate salt is a solid, the ionic liquid phase of reduced organic acid content may be recovered by filtration.

It is envisaged that where the treated oil is a hydrocarbon that has been produced offshore from a porous hydrocarbon bearing formation, that the basic ionic liquid may be contacted with a brine, for example, seawater or a produced water, on a production platform where the pH of the seawater is adjusted using a base to a value of at least 8, preferably at least 10 during the contacting step. Seawater contains naturally occurring Group 1 and Group 2 metal ions in an amount sufficient to complex with the acids contained in the basic ionic liquid. Typically, the pH of the brine may be adjusted to a value in the range 10 to 12 so that the pH of the brine after neutralization of the acids is in the range 4 to 9. The pH of the seawater may be adjusted using a Group 1 and/or 2 metal hydroxide, for example, sodium hydroxide.

Where the basic ionic liquid is insoluble in the polar solvent, it is envisaged that the crude oil and/or crude oil distillate containing the organic acids, the basic ionic liquid and the solution of the Group 1 and/or 2 metal hydroxide in the polar solvent (preferably, water or methanol) may be mixed together in a stirred vessel followed by separation of an oil phase of reduced organic acid content, a polar solvent phase containing Group 1 and/or 2 neutralization salts of the acids and a basic ionic liquid phase.

It is also envisaged that the crude oil and/or crude oil distillate containing the organic acids may be contacted with the basic ionic liquid and the solution of a Group 1 and/or Group 2 metal hydroxide in the polar solvent (preferably, water or methanol) in a counter-current extraction column. For example, the crude oil and/or crude oil distillate containing the organic acids and an aqueous solution of the Group 1 and/or 2 metal hydroxide may be introduced at or near the bottom of the column and the basic ionic liquid at or near the top thereof. Thus, crude oil and/or crude oil distillate having a reduced acid content is removed from at or near the top of the column, basic ionic liquid from at or near the bottom of the column and an aqueous solution of Group 1 and/or 2 metal neutralization salts of the acids are removed at an intermediate position.

Alternatively, a solution of the Group 1 and/or 2 metal hydroxide in methanol may be introduced into the column, at or near the bottom thereof and, depending upon the density of the crude oil and/or crude oil distillate, a solution of the Group 1 and/or Group 2 metal neutralization salts of the acids in methanol may be removed from either at or near the top of the column with the oil of reduced organic-containing acid content being removed from an intermediate position or the crude oil and/or crude oil distillate of reduced acid content may be removed from at or near the top of the column and the solution of the Group 1 and/or Group 2 metal neutralization salts of the acids from an intermediate position.

It is also envisaged that the basic ionic liquid containing the organic acids may be contacted with a $C_1$ to $C_6$ aliphatic alcohol in the presence of an esterification catalyst (for example, a heterogeneous or homogeneous esterification catalyst) under conditions effective to convert at least a portion of the acids into the corresponding esters thereof. These ester derivatives are more volatile than the acids and hence are more readily separated from the basic ionic liquid, for example, by vaporisation at reduced pressure and at a temperature of less than 150° C.

The supported basic ionic liquid may additionally be regenerated by passing a solution of a Group 1 and/or Group 2 metal hydroxide in a polar solvent through the column such that the acids are converted into their corresponding neutralization salts and are washed off the column by the polar solvent. Suitably, the polar solvent is water or a $C_1$ to $C_6$ aliphatic alcohol or mixtures thereof. Preferably, the polar organic solvent is water, methanol or ethanol. Where the basic ionic liquid is physiosorbed onto the silica column, the basic ionic liquid should be insoluble in the polar solvent so that the basic ionic liquid is not stripped from the column. Where the polar solvent is water, the resulting waste water stream may be disposed of, for example, by being injected into a porous subterranean formation (waste water disposal zone). Where the polar organic solvent is methanol or ethanol, the solvent may be driven off from the neutralization salts at reduced pressure.

In yet another aspect of the present invention there is provided a process for removing organic acids from a crude oil and/or a crude oil distillate containing organic acids comprising the steps of:
(i) contacting the crude oil and/or crude oil distillate containing organic acids with a basic solid having the formula:

SUPPORT-(O—Z-Bas)

wherein:
SUPPORT represents a solid support, preferably selected from silica, alumina, alumina-silica, and a zeolite;
Z is a divalent linking group; and
Bas is a basic moiety having the formula —NR$^1$R$^2$, R$^1$ and R$^2$ being independently selected from hydrogen, $C_1$-$C_8$ alkyl, $C_1$-$C_8$ cycloalkyl, $C_6$-$C_{10}$ aryl, $C_6$-$C_{10}$ alkaryl, or $C_6$-$C_{10}$ aralkyl; or a 4 to 8 membered heterocyclic ring comprising at least one basic nitrogen atom; and
(ii) separating a crude oil and/or crude oil distillate product having reduced acidity from the basic solid.

Preferably, R$^1$ and R$^2$ are independently selected from hydrogen, methyl, ethyl, n-propyl, iso-propyl, n-butyl, iso-butyl, sec-butyl, tert-butyl, n-pentyl, n-hexyl, cyclohexyl, phenyl, and benzyl.

In one preferred embodiment, Bas is —NH$_2$.

Where Bas is a heterocyclic ring comprising at least one basic nitrogen atom, Bas is preferably selected from pyrrolidine, piperidine, piperazine, imidazole, pyrazole, pyridine, pyridazine, pyrimidine, and pyrazine.

Z may be a covalent bond, or a $C_1$-$C_{10}$ straight chain or branched alkyl group divalent aliphatic radical (for example, alkylene, alkenylene, cycloalkylene, oxyalkylene, oxyalkyleneoxy, alkyleneoxyalkylene or a polyoxyalkylene) or is a divalent aromatic radical (for example, arylene, alkylenearylene or alkylenearylenealkylene), optionally substituted with one or more groups selected from —NH$_2$, —NHC(=N) NH$_2$, —CO$_2^-$, —CONH$_2$, —SH, $C_1$-$C_4$ alkoxy, $C_1$-$C_4$ alkylthio, phenyl, imidazolyl, indolyl, and hydroxyphenyl.

Preferably, Z is:
(a) a divalent alkylene radical selected from: —(CH$_2$—CH$_2$)—, (CH$_2$—CH$_2$—CH$_2$)—, —(CH$_2$—CH$_2$—CH$_2$—CH$_2$)—, —(CH$_2$—CH$_2$—CH$_2$—CH$_2$—CH$_2$)—, —(CH$_2$—CH$_2$—CH$_2$—CH$_2$—CH$_2$—CH$_2$)—, —(CH$_2$—CH(CH$_3$))—, and —(CH$_2$—CH(CH$_3$)—CH$_2$—CH(CH$_3$))—;
(b) a divalent alkyleneoxyalkylene radical selected from: —(CH$_2$CH$_2$—O—CH$_2$—CH$_2$)—, —(CH$_2$—CH$_2$—O—CH$_2$—CH$_2$—CH$_2$)—, and —(CH$_2$CH(CH$_3$)—O—CH$_2$—CH(CH$_3$))—;
(c) a divalent polyoxyethylene radical selected from: —(CH$_2$CH$_2$O)$_n$— where n is an integer in the range 1 to 9 or —(CH$_2$CH(CH$_3$)O)$_m$— where m is an integer in the range 1 to 6; and
(d) a divalent alkylenearylene or an alkylenearylenealkylene radical selected from: —(CH$_2$—C$_6$H$_4$)—, and —(CH$_2$—C$_6$H$_4$—CH$_2$)—.

It will be appreciated that a single solid support (SUPPORT) may have a large number of pendant —O—Z-Bas groups. It will further be appreciated that the oxygen atom in the —O—Z-Bas moiety is derived from pendant —OH groups on the silica, alumina, silica-alumina, or the zeolite.

It will be readily appreciated that SUPPORT-(O—Z-Bas) may be used in accordance with one or more of the processes disclosed above and/or recycled in accordance with one or more of the regeneration processes disclosed above.

The processes of the present inventions provide a crude oil/crude oil distillate having reduced acid content.

The processes of the present inventions may be carried out on an offshore platform, in a refinery, or whilst the oil is being transported, for example, in a tanker at sea.

The present inventions will now be described further by way of example.

EXAMPLES

Test Oils

The oils used in the examples below are as follows:
Model oil (dodecane doped with naphthenic acids (NAs), TAN 3.00 mg/g KOH); and
Crude oil (Chad crude oil (TAN 3.91 mg/g KOH))

Ionic Liquids

A series of amino-acid ionic liquids based on a methyl-tributylammonium [$N_{4,4,4,1}$] cation were chosen for the extraction of naphthenic acids from model and crude oil. The ionic liquids were produced using known methods.

Experimental Procedures

General Procedure for the Removal of Naphthenic Acids Using Bases with Model/Crude Oil in a Solid-Liquid or Liquid-Liquid Extraction To a sample vial containing 7.00 g of model/crude oil (TAN 3.00 mg KOH/g and TAN 3.91 respectively) was added the specified mass of ionic liquid. The resulting mixture solution was stirred for the desired length of time at the specified temperature. For the liquid-liquid extraction, the sample was then centrifuged at 3000 rpm for 10 minutes. After separation of the phases, ~5.00 g of the model/crude oil was taken and analysed by titration.

General Procedure for the Recycling of the Ionic Liquids and the Basic Solids Using Carbonic Acid After phase separation, to the resultant lower layer was added 15 ml of water saturated with $CO_2$. This was stirred for one hour and then the cloudy solution was centrifuged at 3000 rpm for 60 minutes. For the ionic liquid extractions the upper oil phase was removed and the lower aqueous phase was dried to leave the ionic liquid which was recycled according to the general procedure above. For the basic solids both the oil and aqueous phase were removed before drying of the solid prior to recycle.

General Procedure for the Recycling of the Ionic Liquids Using Calcium Hydroxide (i.e. Metal Hydroxides)

After phase separation, to the resultant lower layer was added 15 ml of an aqueous 0.025M solution of calcium hydroxide. This was stirred for one hour and then the resultant cloudy solution was centrifuged at 3000 rpm for 60 minutes. For the ionic liquid extractions the upper oil phase was removed and the lower aqueous phase was filtered and dried to leave the ionic liquid which was recycled according to the general procedure above.

General Procedure for the Recycling of the Ionic Liquids Using Dolomite (i.e. Carbonate Salts)

After phase separation, to the resultant lower layer was added 2 ml of deionised water. This was stirred for 5 minutes and 0.100 g of Dolomite was added to the solution. This was stirred for one hour after which the resultant slurry was filtered. The resultant filtrate was dried to leave the ionic liquid which was recycled according to the general procedure above.

Unsupported Basic Ionic Liquids

Two basic ionic liquids derived from lysine and proline were tested with the crude oil sample, and the results are shown in Table 2 below.

The results clearly demonstrate that for both the prolinate and lysinate systems an OIL:IL mass ratio of ~100:1 is capable of reducing naphthenic acids in the crude to below 0.1 mg/g.

Similar results were obtained for tests using serinate.

TABLE 2

Resultant TAN number upon extraction of ~7 g of crude oil with [$N_{4,4,4,1}$][Lysinate] and [Prolinate]

| Entry | IL | IL mass (g) | mMoles of IL | OIL/IL Mass ratio | Crude Oil Resultant TAN |
|---|---|---|---|---|---|
| 1 | N[Lys] | 0.065 | 0.19 | 111 | <0.1 |
| 2 | N[Pro] | 0.072 | 0.23 | 99 | <0.1 |

Recycling of Unsupported Basic Ionic Liquids

The application of ionic liquids as reagents to remove naphthenic acids from oil was further explored by subjecting these reagents to recycle.

Table 3 (below) demonstrates the advantages of regeneration via a carbonic acid wash in accordance with an aspect of the present inventions, versus non-regeneration. Two basic ionic liquids derived from serine and taurine were used.

TABLE 3

Comparison of regenerative and non-regenerative recycle of [$N_{4,4,4,1}$][serinate] and [$N_{4,4,4,1}$][taurinate] using carbonic acid on resulting TAN numbers in model oil

| Ionic liquid | Non-regenerated (mg/g KOH) | | | Carbonic wash (mg/g KOH) | | |
|---|---|---|---|---|---|---|
| 0.25 g | 1 | 2 | 3 | 1 | 2 | 3 |
| N[Ser] | 0.24 | 0.27 | 0.44 | 0.24 | 0.24 | 0.28 |
| N[Tau] | 0.98 | 1.30 | 1.59 | 1.00 | 1.12 | 1.15 |

In both ionic liquids studied the resulting TAN number increases where the amino-acid basic ionic liquid is recycled without regeneration. In clear contrast, the use of carbonic acid regeneration of the amino-acid basic ionic liquid results in good activity being retained, and in some cases almost that of the original starting amino-acid basic ionic liquid.

Table 4 (below) demonstrates the advantages of regeneration using metal salts in accordance with an aspect of the present inventions, versus non-regeneration. Under both recycling conditions using calcium hydroxide or dolomite good activity is obtained in comparison to the non-regenerated ionic liquid.

TABLE 4

Comparison of regenerative and non-regenerative recycle of [$N_{4441}$][lysinate](0.18 g) using $Ca(OH)_2$ or Dolomite on resulting TAN numbers in model oil

| Expt no | Non-regenerated (mg/g KOH) | $Ca(OH)_2$ (mg/g KOH) | Dolomite (mg/g KOH) |
|---|---|---|---|
| 1 | 0.72 | 0.67 | 0.69 |
| 2 | 2.12 | 1.13 | 0.89 |
| 3 | 2.88 | 1.99 | 1.83 |

The above results from tables 3 and 4 demonstrate a number of cheap and facile processes for basic ionic liquid recycling.

Supported Basic Ionic Liquids

Lysinate ionic liquid was supported onto silica (IL:$SiO_2$ mass 1:2) by wet impregnation and its performance compared at various ionic liquid to oil mass ratios (see Table 5 below).

The results in table 5 demonstrate that high OIL:IL mass ratios may be used for naphthenic acid removal, and that the ratios are greater than for the corresponding liquid-liquid systems. A further advantage of supporting the basic ionic liquids is that it makes accurate weighing of the desired amounts of ionic liquid more feasible.

TABLE 5

Resultant TAN number upon extraction of ~7 g of crude oil at 50° C. for 15 mins with varying masses of Supported [N$_{4,4,4,1}$][Lysinate]

| Entry | Ionic liquid | IL mass (g) | mMoles of IL | OIL/IL Mass ratio | Crude Oil Resultant TAN |
|---|---|---|---|---|---|
| 1 | N[Lys] | 0.023 | 0.07 | 304 | 2.13 |
| 2 | N[Lys] | 0.033 | 0.09 | 212 | 1.93 |
| 3 | N[Lys] | 0.040 | 0.12 | 175 | 1.60 |
| 4 | N[Lys] | 0.058 | 0.17 | 120 | 1.22 |

Basic Solids

The use of basic solids for solid adsorption of naphthenic acids has also been explored using covalently tethered organic bases, such as an aminopropyl silica (see Structure 1 below), results of which are shown in Table 6 (also below).

Structure 1: Structure of the Covalently Tethered Aminopropyl Silica

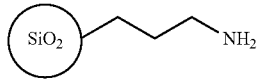

As was noted with the supported basic ionic liquids, the aminopropyl silicas have been shown to reduce naphthenic acids in both model oil and crude oil systems. While the results appear to be inferior to the basic ionic liquids and supported basic ionic liquid systems, one major advantage is that the aminopropyl silicas negate the potential for reagent leaching into the bulk oil.

TABLE 6

Remaining TAN number after extraction of the liquid phase when using aminopropyl silicas

| silica 1.0 g | N loading (mmol g$^{-1}$) | Model Oil | Crude oil |
|---|---|---|---|
| Silica 1 | 1.27 | 2.47 | 3.81 |
| Silica 2 | 1.14 | 2.27 | 3.03 |
| Silica 3 | 1.87 | 0.21 | 1.06 |
| Silica 4 | 2.11 | 0.20 | 1.83 |

Recycling of Basic Solids

Similar to the basic ionic liquid recycle experiments, regeneration of the aminopropyl silicas can also be achieved with the use of carbonic acid (see Table 7 below).

TABLE 7

Recycle of the aminopropyl silicas/model oil using carbonic wash

| Silica | Non-regenerated | | Carbonic wash | |
|---|---|---|---|---|
| 1.0 g | TAN 1 | TAN 2 | TAN 1 | TAN 2 |
| Silica 2 | 2.31 | 2.93 | 2.27 | 2.73 |
| Silica 3 | 0.41 | 1.13 | 0.21 | 0.34 |
| Silica 4 | 0.35 | 1.34 | 0.20 | 0.24 |

Silicas 2 and 3 show similar activity after regeneration compared to the initial experiments. In contrast without regeneration the extraction ability of these solids decreases significantly.

CONCLUSION

The use of the selected basic ionic liquids of the present inventions allows for TAN levels in crude oil to be reduced to <0.1 with OIL:IL ratios as high as ~100:1.

Solid supporting of these ionic liquids, such as ammonium lysinate, allows a significant naphthenic acid reduction to be achieved with OIL:IL ratios greater than 300:1.

The use of covalently tethered organic bases can also be employed as supported reagents to remove naphthenic acids from crude oil.

Both the ionic liquid and aminopropyl silica reagents can be effectively recycled after use by simple regeneration using a number of different methods.

The invention claimed is:

1. A process for removing organic acids from at least one of a crude oil containing organic acids or a crude oil distillate containing organic acids, the process comprising the steps of:
   (i) contacting the at least one of the crude oil containing organic acids or the crude oil distillate containing organic acids with a supported basic ionic liquid having a basic anion selected from serinate, prolinate, histidinate, threoninate, valinate, asparaginate, taurinate and lysinate, wherein the at least one of the crude oil containing organic acids or the crude oil distillate containing organic acids and the ionic liquid are contacted in a mass ratio of from greater than 40:1; and
   (ii) obtaining at least one of a crude oil product or a crude oil distillate product having reduced acidity which is separated from the supported basic ionic liquid.

2. A process according to claim 1, wherein the organic acids are naphthenic acids.

3. A process according to claim 1, wherein the crude oil and/or crude oil distillate and the ionic liquid are contacted in a mass ratio of up to 300:1.

4. A process according to claim 1, wherein the at least one of the crude oil containing organic acids or the crude oil distillate containing organic acids-and the ionic liquid are contacted in a mass ratio of up to 200:1.

5. A process according to claim 1, wherein the at least one of the crude oil containing organic acids or the crude oil distillate containing organic acids-and the ionic liquid are contacted in a mass ratio of from 50:1.

6. A process according to claim 1, wherein the at least one of the crude oil containing organic acids or the crude oil distillate containing organic acids-and the ionic liquid are contacted in a mass ratio of from 100:1.

7. A process according to claim 1, wherein the basic anion is selected from serinate, lysinate, prolinate, taurinate and threoninate.

8. A process according to claim 7, wherein the basic anion is selected from lysinate, prolinate and serinate.

9. A process according to claim 1, wherein the support is selected from silica, alumina, alumina-silica, or a zeolite.

10. A process according to claim 9, wherein the support is silica.

11. A process according to claim 1, wherein the ionic liquid is adsorbed onto the support in an ionic liquid:support mass ratio of from 10:1 to 1:10.

12. A process according to claim 11, wherein the ionic liquid is adsorbed onto the support in an ionic liquid:support mass ratio of from 1:2 to 2:1.

13. A process for removing organic acids from at least one of a crude oil containing organic acids or a crude oil distillate containing organic acids, the process comprising the steps of:
   (i) contacting the at least one of the crude oil containing organic acids or the crude oil distillate containing organic acids with a basic ionic liquid having a basic anion selected from serinate, prolinate, histidinate, threoninate, valinate, asparaginate, taurinate and lysinate, and further wherein the at least one of the crude oil containing organic acids or the crude oil distillate containing organic acids and ionic liquid are contacted in a mass ratio of from greater than 40:1; and (ii) obtaining at least one of a crude oil product or a crude oil distillate product having reduced acidity which is separated from the basic ionic liquid.

14. A process according to claim 13, wherein the basic anion is selected from serinate, lysinate and prolinate.

15. A process according to claim 13, wherein the basic anion is selected from is selected from histidinate and taurinate.

16. A process according to claim 13, wherein the basic ionic liquid has a melting point of less than 150° C.

17. A process according to claim 13, wherein the organic acids are naphthenic acids.

18. A process according to claim 13, wherein the basic ionic liquid comprises a cation selected or derived from the group consisting of: ammonium, azaannulenium, azathiazolium, benzimidazolium, benzofuranium, benzotriazolium, borolium, cinnolinium, diazabicyclodecenium, diazabicyclononenium, diazabicycloundecenium, dithiazolium, furanium, guanidinium, imidazolium, indazolium, indolinium, indolium, morpholinium, oxaborolium, oxaphospholium, oxazinium, oxazolium, iso-oxazolium, oxathiazolium, pentazolium, phospholium, phosphonium, phthalazinium, piperazinium, piperidinium, pyranium, pyrazinium, pyrazolium, pyridazinium, pyridinium, pyrimidinium, pyrrolidinium, pyrrolium, quinazolinium, quinolinium, iso-quinolinium, quinoxalinium, selenazolium, sulfonium, tetrazolium, thiadiazolium, iso-thiadiazolium, thiazinium, thiazolium, thiophenium, thiuronium, triazadecenium, triazinium, triazolium, iso-triazolium, and uronium.

19. A process according to claim 18 wherein the cation is selected from the group consisting of:

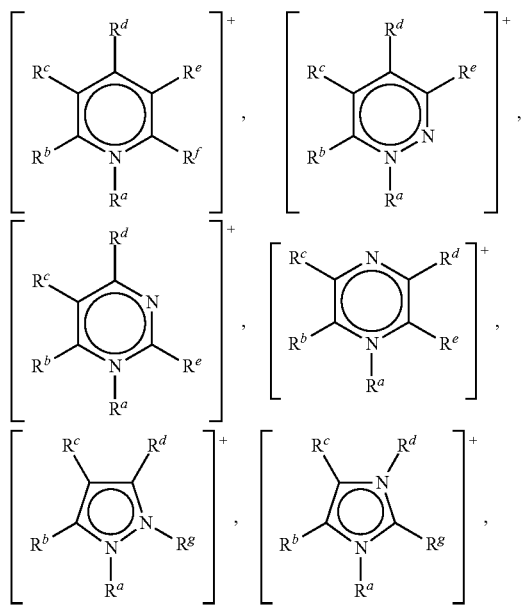

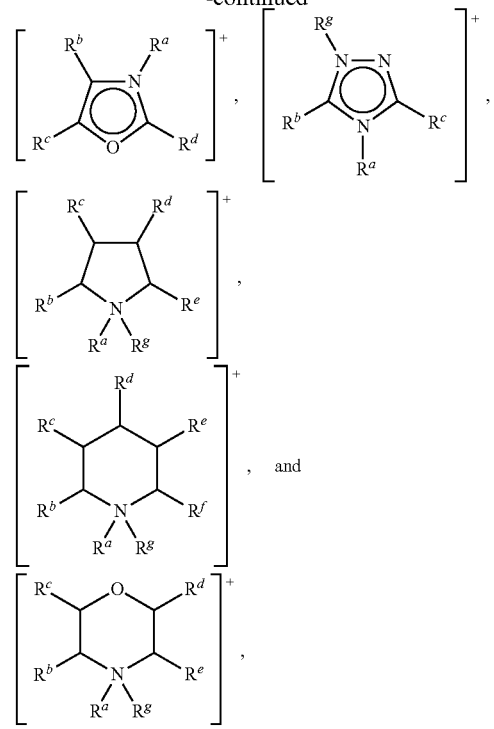

wherein: $R^a$, $R^b$, $R^c$, $R^d$, $R^e$, $R^f$ and $R^g$ are each independently selected from hydrogen, a $C_1$ to $C_{30}$, straight chain or branched alkyl group, a $C_3$ to $C_8$ cycloalkyl group, or a $C_6$ to $C_{10}$ aryl group, wherein said alkyl, cycloalkyl or aryl groups are unsubstituted or may be substituted by one to three groups selected from: $C_1$ to $C_6$ alkoxy, $C_2$ to $C_{12}$ alkoxyalkoxy, $C_3$ to $C_8$ cycloalkyl, $C_6$ to $C_{10}$ aryl, —CN, —OH, —SH, —$NO_2$, $C_6$ to $C_{10}$ aryl and $C_7$ to $C_{10}$ alkaryl, —$CO_2$($C_1$ to $C_6$)alkyl, —OC(O)($C_1$ to $C_6$)alkyl, or any two of $R^b$, $R^c$, $R^d$, $R^e$ and $R^f$ attached to adjacent carbon atoms form a methylene chain —$(CH_2)_q$— wherein q is from 3 to 6.

20. A process according to claim 18, wherein the cation is selected from the group consisting of:

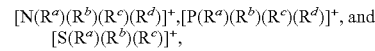

wherein: $R^a$, $R^b$, $R^c$ and $R^d$ are as defined in claim 19.

21. A process according to claim 20, wherein [Cat$^+$] is selected from:

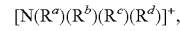

wherein: $R^a$, $R^b$, $R^c$ and $R^d$ are each independently selected from $C_1$ to $C_8$ alkyl.

22. A process according to claim 13, wherein the organic acids are removed from crude oil or a crude oil distillate selected from liquefied petroleum gas, gasoline, naphtha, kerosene, diesel fuel, fuel oil, lubricating oil and paraffin wax, or a mixture thereof.

23. A process according to claim 13, wherein the basic ionic liquid additionally comprises a basic cation represented by the formula:

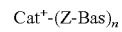

wherein:
  Cat⁺ is a positively charged moiety;
  Bas is a basic moiety;
  Z is a covalent bond joining Cat⁺ and Bas, or is a divalent linking group; and
  n is an integer of from 1 to 3.

24. A process according to claim 23, wherein n is 1.

25. A process according to claim 23, wherein Bas comprises a heterocyclic ring system containing a basic nitrogen atom.

26. A process according to claim 23, wherein Bas represents a group of formula —N(R¹)(R²), —P(R¹)(R²), —SR³, or —OR³, in which R¹ and R² are independently selected from hydrogen, alkyl, cycloalkyl, aryl and substituted aryl, or, in the case of an —N(R¹)(R²) group, R¹ and R² together with the interjacent nitrogen atom form part of a heterocyclic ring, and R³ is selected from alkyl, cycloalkyl, aryl and substituted aryl.

27. A process according to claim 26, wherein R¹, R² and R³ are selected from methyl, ethyl, n-propyl, isopropyl, n-butyl, iso-butyl, tert-butyl, n-pentyl, n-hexyl, cyclohexyl, benzyl and phenyl, or, in the case of an —N(R¹)(R²) group, R¹ and R² together represent a tetramethylene or pentamethylene group optionally substituted by one or more $C_{1-4}$ alkyl groups.

28. A process according to claim 23, wherein Z is a divalent organic radical having from 1 to 18 carbon atoms.

29. A process according to claim 28, wherein Z represents a divalent alkylene radical selected from:
  (a) —(CH₂—CH₂)—, (CH₂—CH₂—CH₂)—, —(CH₂—CH₂—CH₂—CH₂)—, —(CH₂—CH₂—CH₂—CH₂—CH₂)—, —(CH₂—CH₂—CH₂—CH₂—CH₂—CH₂)—, —(CH₂—CH(CH₃))—, and —(CH₂—CH(CH₃)—CH₂—CH(CH₃))—;
  (b) a divalent alkyleneoxyalkylene radical selected from: —(CH₂—CH₂—O—CH₂—CH₂)—, —(CH₂—CH₂—O—CH₂—CH₂—CH₂)—, and —(CH₂—CH(CH₃)—OCH₂—CH(CH₃))—;
  (c) a divalent polyoxyethylene radical selected from: —(CH₂CH₂O)$_n$— where n is an integer in the range 1 to 9 or —(CH₂CH(CH₃)O)$_m$— where m is an integer in the range 1 to 6; or
  (d) a divalent alkylenearylene or an alkylenearylenealkylene radical selected from: —(CH₂—C₆H₄)—, and —(CH₂—C₆H₄—CH₂)—.

30. A process according to claim 23, wherein Cat⁺ represents a heterocyclic ring structure selected from ammonium, azaannulenium, azathiazolium, benzimidazolium, benzofuranium, benzothiophenium, benzotriazolium, borolium, cinnolinium, diazabicyclodecenium, diazabicyclononenium, diazabicycloundecenium, dibenzofuranium, dibenzothiophenium, dithiazolium, furanium, guanidinium, imidazolium, indazolium, indolinium, indolium, morpholinium, oxaborolium, oxaphospholium, oxathiazolium, oxazinium, oxazolium, iso-oxazolium, oxazolinium, pentazolium, phospholium, phosphonium, phthalazinium, piperazinium, piperidinium, pyranium, pyrazinium, pyrazolium, pyridazinium, pyridinium, pyrimidinium, pyrrolidinium, pyrrolium, quinazolinium, quinolinium, iso-quinolinium, quinoxalinium, selenazolium, sulfonium, tetrazolium, thiadiazolium, iso-thiadiazolium, thiazinium, thiazolium, iso-thiazolium, thiophenium, thiuronium, triazadecenium, triazinium, triazolium, iso-triazolium, and uronium.

31. A process according to claim 30, wherein Cat⁺-Z-Bas represents:

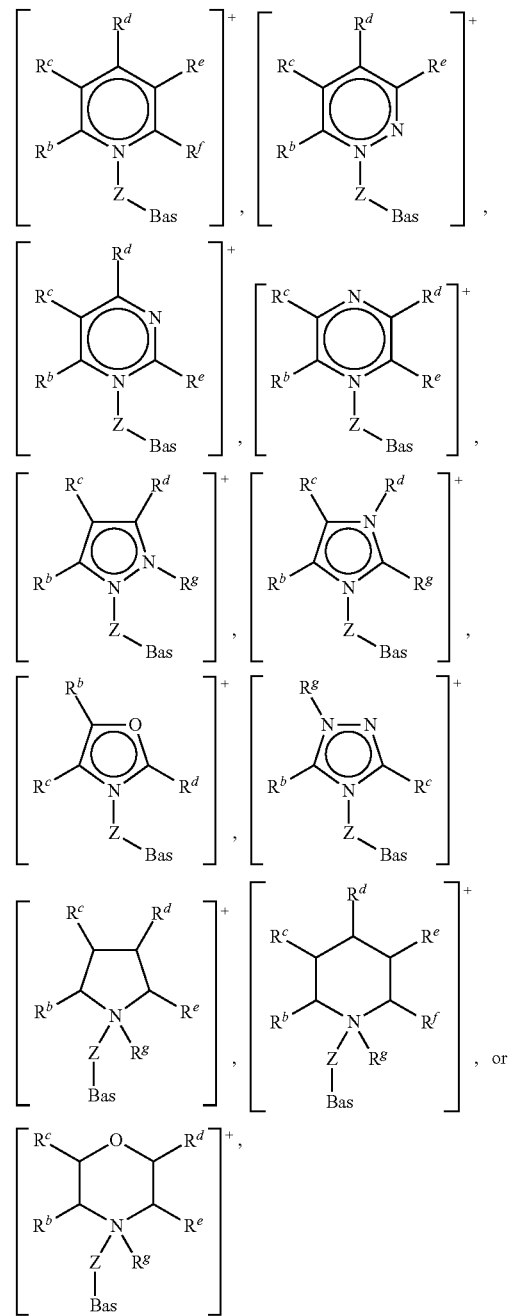

wherein: Bas and Z are as defined as in any one of claims 4 to 10; and $R^b$, $R^c$, $R^d$, $R^e$, $R^f$ and $R^g$ are independently selected from hydrogen, a $C_1$ to $C_{40}$ alkyl group, a $C_3$ to $C_8$ cycloalkyl group, or a $C_6$ to $C_{10}$ aryl group, wherein said alkyl, cycloalkyl or aryl groups are unsubstituted or may be substituted by one to three groups selected from: $C_1$ to $C_6$ alkoxy, $C_6$ to $C_{10}$ aryl, CN, OH, NO₂, $C_7$ to $C_{30}$ aralkyl and $C_7$ to $C_{30}$ alkaryl, or any two of $R^b$, $R^c$, $R^d$, $R^e$ and $R^f$ attached to adjacent carbon atoms on the ring structure form a methylene chain —(CH₂)$_p$— wherein p is an integer from 3 to 5.

32. A process according to claim 18, wherein Cat$^+$-Z-Bas is selected from:

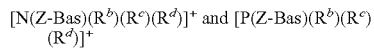

wherein: Bas and Z are as defined in any one of claims 18 to 26 and each of $R^b$, $R^c$, and $R^d$ are independently selected from methyl and ethyl.

33. A process according to claim 13, wherein the material to be deacidified is crude oil or a crude oil distillate selected from liquefied petroleum gas, gasoline, gas oil, diesel, jet fuel, kerosene, home heating oil, and mixtures thereof.

34. A process according to claim 13, further comprising recovering the basic ionic liquid.

35. A process according to claim 13, further comprising recovering the basic ionic liquid from the organic acids by way of a regeneration process.

36. A process according to claim 35, wherein the regeneration process comprises:
  (i) contacting the basic ionic liquid with an acid having a pKa of less than 6.75.

37. A process according to claim 36, wherein the regeneration process further comprises the steps of:
  (ii) contacting the mixture of step (i) with a solvent which is immiscible with the basic ionic liquid; and
  (iii) separating the solvent from the ionic liquid.

38. A process for the regeneration of a basic ionic liquid comprising organic acids from crude oil/crude oil distillates comprising the steps of:
  (i) contacting the basic ionic liquid with an acid having a pKa of less than 6.75;
  (ii) contacting the mixture of step (i) with a solvent which is immiscible with the basic ionic liquid; and
  (iii) separating the solvent from the ionic liquid.

39. A process according to claim 38 wherein the pKa of the acid is less than 6.25.

40. A process accord to claim 38, wherein the acid is carbonic acid.

41. A process for removing organic acids from at least one of a crude oil containing organic acids or a crude oil distillate containing organic acids, the process comprising the steps of:
  (i) contacting the at least one of the crude oil containing organic acids or the crude oil distillate containing organic acids with a basic solid having the formula:

SUPPORT-(O—Z-Bas)

wherein:
  SUPPORT represents a solid support;
    Z is a divalent linking group; and
      Bas is a basic moiety having the formula —NR$^1$R$^2$, R$^1$ and R$^2$ being independently selected from hydrogen, $C_1$-$C_8$ alkyl, $C_1$-$C_8$ cycloalkyl, $C_6$-$C_{10}$ aryl, $C_6$-$C_{10}$ alkaryl, or $C_6$-$C_{10}$ aralkyl; or a 4 to 8 membered heterocyclic ring comprising at least one basic nitrogen atom; and
  (ii) separating at least one of a crude oil product or a crude oil distillate product having reduced acidity from the basic solid.

42. A process according to claim 41, wherein R$^1$ and R$^2$ are independently selected from hydrogen, methyl, ethyl, n-propyl, iso-propyl, n-butyl, iso-butyl, sec-butyl, tert-butyl, n-pentyl, n-hexyl, cyclohexyl, phenyl, benzyl.

43. A process according to claim 42, wherein Bas is —NH$_2$.

44. A process according to claim 41, wherein the heterocyclic ring comprising at least one basic nitrogen atom is selected from pyrrolidine, piperidine, piperazine, imidazole, pyrazole, pyridine, pyridazine, pyrimidine, and pyrazine.

45. A process according to claim 41, wherein Z represents a covalent bond, or a $C_1$-$C_{10}$ straight chain or branched alkyl group, optionally substituted with one or more groups selected from —NH$_2$, —NHC(=N)NH$_2$, —CO$_2^-$, —CONH$_2$, —SH, $C_1$-$C_4$ alkoxy, $C_1$-$C_4$ alkylthio, phenyl, imidazolyl, indolyl, and hydroxyphenyl.

46. A process according to claim 41, wherein the solid support is selected from silica, alumina, alumina-silica, and a zeolite.

47. A process according to claim 1, wherein the least one of the crude oil product or the crude oil distillate product having reduced acidity has a TAN value of less than 0.25 mg/g.

* * * * *